(12) United States Patent
Zhang et al.

(10) Patent No.: US 7,699,977 B2
(45) Date of Patent: Apr. 20, 2010

(54) ASSEMBLING UNIT FOR FILTRATION AND ADSORPTION OF WASTE AND SEWAGE WATER

(75) Inventors: Dawei Zhang, Shenyang (CN); Yanbin Guo, Shenyang (CN)

(73) Assignee: Shenyang David Environmental Protection & Energy Saving Equipment Co., Ltd., Shenyang (CN)

( * ) Notice: Subject to any disclaimer, the term of this patent is extended or adjusted under 35 U.S.C. 154(b) by 465 days.

(21) Appl. No.: 11/575,400

(22) PCT Filed: Sep. 21, 2005

(86) PCT No.: PCT/CN2005/001518

§ 371 (c)(1),
(2), (4) Date: Mar. 16, 2007

(87) PCT Pub. No.: WO2006/032200

PCT Pub. Date: Mar. 30, 2006

(65) Prior Publication Data

US 2007/0199867 A1    Aug. 30, 2007

(30) Foreign Application Priority Data

Sep. 21, 2004    (CN)    ......................... 2004 1 0050470

(51) Int. Cl.
*C02F 1/28*    (2006.01)

(52) U.S. Cl. .................. 210/95; 210/96.1; 210/104; 210/108; 210/134; 210/143; 210/257.1; 210/258; 210/259; 210/266; 210/268; 210/275; 210/291; 210/502.1; 210/928

(58) Field of Classification Search .............. 210/85–87, 210/90, 95, 96.1, 143, 252, 253, 257.1, 258–262, 210/265, 266, 268, 275, 291, 502.1, 104, 210/108, 134, 928
See application file for complete search history.

(56) References Cited

U.S. PATENT DOCUMENTS 4,105,549 A * 8/1978 Kakumoto et al. .......... 210/675
4,133,759 A * 1/1979 Ikeda et al. ................. 210/104

* cited by examiner

*Primary Examiner*—Matthew O Savage

(57) ABSTRACT

Wastewater and sewage filtering and adsorbing unit includes sewage reservoir, clean water reservoir, active coke powder storage, filtering and adsorbing tank, control cabinet, saturated active coke sludge settling tank, filtering and adsorbing material. The sewage reservoir and the clean water reservoir are on one side, and the filtering and adsorbing tank and the active coke powder storage are on other side. Active coke powder storage is above and connected to filtering and adsorbing tank by conduits; inlet pipes in rows and an outlet branch pipe are mounted into the filtering and adsorbing tank. Filtering and adsorbing material is active coke powder. The sewage reservoir is connected with the filtering and adsorbing tank. An active coke sludge discharge port and an active coke sludge conveyor, which are connected to the saturated active coke sludge settling tank by transporting pipelines, are at the bottom of the filtering and adsorbing tank.

8 Claims, 4 Drawing Sheets

ASSEMBLING UNIT FOR FILTRATION AND ADSORPTION OF WASTE AND SEWAGE WATER

BACKGROUND OF THE INVENTION

1. Field of the Invention

The present invention generally relates to a treatment technique of wastewater, waste liquid, and sewage, and more particularly, relates to a treatment technique for industrial wastewater, waste liquid, and municipal sewage utilizing active coke powder, and an apparatus thereof.

2. The Prior Arts

At the present, the following methods are generally performed by facilities and apparatus for the treatment of industrial wastewater, waste liquid, and municipal sewage: the industrial wastewater, waste liquid, and municipal sewage are passed in turn through bar screens, centrifuge, equalization basins, primary sedimentation tanks, aeration tanks, secondary sedimentation tanks, and tube settlers; and also various chemicals are utilized for performing biochemical and physiochemical treatments, such as sedimentation, flocculation, floatation, activated sludge process, aeration, or anaerobic fermentation. However, the above mentioned facilities and apparatus have the following disadvantages such as having overcomplicated techniques, occupying too much space, and requiring higher investment and operational costs; in particular, it is difficult for the facilities to meet the government emission standards when treating industrial wastewater having complex components, and waste liquid with high COD (Chemical Oxygen Demand).

SUMMARY OF THE INVENTION

Aiming at overcoming the above disadvantages, the present invention provides a wastewater, waste liquid, and sewage filtering and adsorbing unit utilizing active coke powder as the filtering and adsorbing material for its favorable characteristics of filtration and adsorption. The present invention can provide for filtering and adsorbing treatment for industrial wastewater, waste liquid, and municipal sewage, reducing COD and SS (suspended solids) value of wastewater and waste liquid, and effectively treating wastewater and sewage with excessive COD and SS value. As a result, the treatment capability and the wastewater and sewage treatment quality of an already-built treatment plant can be improved, and its treatment cost for the wastewater, waste liquid, and sewage can be reduced. Also, the capital investment for a newly-built sewage treatment plant can be economized. The saturated active coke sludge discharged from the wastewater, waste liquid, and sewage filtering and adsorbing unit can be made into fuel for a solid and liquid propane dual-fuel circulating fluidized bed boiler (which is another invention by the same inventor of the present invention, and which has been put into production).

The present invention provides a wastewater and sewage filtering and adsorbing unit, comprising: 1) an active coke powder storage, 2) a sewage reservoir, 3) a conveyor pump, 4) a filtering and adsorbing tank, 5) a saturated active coke sludge settling tank, 6) a control cabinet, 7) a pressure sensor, 8) an inlet flow meter, 9) a water flow adjusting valve, 10) an outlet flow meter, 11) a plurality of inlet pipes in rows, 12) a plurality of outlet pipes in rows, 13) a filter screen, 14) an active coke sludge discharge port, 15) an observation window, 16) an online water quality monitoring sensor, 17) a pressure gauge, 18) a plurality of pipes in parallel, 19) a plurality of standpipes, 20) an active coke sludge conveyor device, 21) a backwashing pump, 22) a liquid level sensor, 23) a plurality of overflow pipes, 24) a saturated active coke sludge metering device, 25) a filter, 26) a clean water reservoir, 27) a transport conduit, 28) an inlet branch pipe, 29) an outlet branch pipe, 30) a main inlet pipe, 31) a main outlet pipe, 32) an inlet port, 33) an outlet port, 34) a filtering and adsorbing material, such as active coke powder, 35) a discharge pipe, 36) a plurality of transport pipelines, and 37) a clean water reservoir outlet port (see FIG. 1 and 2).

The present invention provides a wastewater and sewage filtering and adsorbing unit comprising a sewage reservoir 2, a clean water reservoir 26, an active coke powder storage 1, a filtering and adsorbing tank 4, a control cabinet 6, a saturated active coke sludge settling tank 5, and a filtering and adsorbing material 34, in which the filtering and adsorbing material is active coke powder, and which can be bituminous active coke powder, lignite active semi-coke powder, active silica coke powder, active gas-coal coke powder, or metallurgical active coke powder. The sewage reservoir 2 and the clean water reservoir 26 are positioned adjacent to each other on one side, the filtering and adsorbing tank 4 and the active coke powder storage 1 are positioned adjacent to each other on the other side, with the active coke powder storage 1 mounted above the filtering and adsorbing tank 4, and the bottom of the active coke powder storage 1 is connected to the top of the filtering and adsorbing tank 4 by means of a plurality of conduits therebetween for transporting the active coke powder; a plurality of inlet pipes in rows 11 connected by a plurality of inlet branch pipes 28 and a plurality of outlet pipes in rows 12 connected by a plurality of outlet branch pipes 29 are disposed inside the filtering and adsorbing tank 4; a main inlet pipe 30 is used for connecting an outlet port of the sewage reservoir 2 and the inlet branch pipes 28 of the filtering and adsorbing tank 4. A filter 25, a conveyor pump 3, a pressure sensor 7, an inlet flow meter 8, an online water quality monitoring sensor 16, and a pressure gauge 17 are mounted on the main inlet pipe 30. A main outlet pipe 31 is used for connecting between an outlet branch pipe 29 of the filtering and adsorbing tank 4 and an inlet port of the clean water reservoir 26. An outlet flow meter 10 and an online water quality monitoring sensor 16 are mounted on the main outlet pipe 31. The active coke powder storage 1 is used for storing the active coke powder, which is used as the filtering and adsorbing material 34. In addition, a plurality of overflow pipes 23 are mounted in the center portion of the active coke powder storage 1, and the overflow pipes 23 are connected with the sewage reservoir 2. The bottom of the filtering and adsorbing tank 4 is provided with a saturated active coke sludge discharge port 14, and is also connected with a transport conduit 27, an active coke sludge conveyor device 20, a transport pipeline 36, and the saturated active coke sludge settling tank 5, respectively. An outlet port 33 is provided on the upper portion of the saturated active coke sludge settling tank 5, and the bottom active coke sludge discharge port is connected with the active coke sludge conveyor device 20.

The conveyor pump 3, which is mounted on the main inlet pipe 30 between the sewage reservoir 2 and the filtering and adsorbing tank 4, transports sewage from the sewage reservoir 2 to the filtering and adsorbing tank 4. Besides the installation of the conveyor pump 3 on the main inlet pipe 30 between the sewage reservoir 2 and the filtering and adsorbing tank 4, a inlet flow adjusting valve 9, a pressure sensor 7, an inlet flow meter 8 and an online water quality monitoring sensor 16 are also mounted on the main inlet pipe 30 between the sewage reservoir 2 and the filtering and adsorbing tank 4 for measuring pressure, flowrate, and quality of the wastewater, waste liquid, and sewage flow into the filtering and adsorbing tank 4, and transmitting the corresponding signals to the control cabinet 6, and adjusting and controlling the amount of the wastewater, waste liquid, and sewage flow into the filtering and adsorbing tank 4.

The inlet pipes in rows 11 and the outlet pipes in rows 12 are installed in the filtering and adsorbing tank 4, in which the inlet pipes in rows 11 are formed from a plurality of standpipes 19 of DN15~40 (diameter 15-40 mm). Each of the standpipes 19 is covered with 1-3 mm diameter pores thereon, and the exterior of each standpipe 19 is provided with a filter screen 13 of 20~50 mesh, which is made of stainless steel; each row of standpipes 19 is connected with the inlet branch pipe 28; and the water flow adjusting valve 9 is mounted at between the inlet branch pipe 28 and the main inlet pipe 30; the outlet pipes in rows 12 are formed from a plurality of standpipes 19 of DN15~40, where each standpipe 19 is covered with pores of 1~3 mm diameter thereon, and the exterior of each standpipe 19 is provided with a filter screen 13 of 20~50 mesh, which is made of stainless steel. Each row of the standpipes 19 is connected with the outlet branch pipe 29. The water flow adjusting valve 9 is mounted at the connecting junction of the outlet branch pipe 29 and the main outlet pipe 31, and the outlet branch pipe 29 is mounted with the pipes in parallel 18; the pipes in parallel 18 are provided with valves, and are connected with a backwashing pump 21.

The distance between the inlet pipes in rows 11 and the outlet pipes in rows 12 disposed in the filtering and adsorbing tank 4 is between 0.5 m~1.5 m; the flow rate of the wastewater, waste liquid, and sewage to be treated in the filtering and adsorbing tank 4 is between 0.16~0.4 m/min; and the contact time between the wastewater, waste liquid, or sewage and the active coke powder in the filtering and adsorbing tank 4 is 12~20 min, in which the distance between the inlet pipes in rows 11 and the outlet pipes in rows 12 can be controlled by positioning the inlet branch pipe 28 and the outlet branch pipe 29 according to the COD and SS values of the wastewater, waste liquid, and sewage to be treated; and the contact time between the wastewater, waste liquid or sewage and the active coke powder can be controlled and adjusted by controlling the flow rate and flow amount of the wastewater, waste liquid, or sewage into the filtering and adsorbing tank 4. When the wastewater in the sewage reservoir is transported into the filtering and adsorbing tank 4 by means of the conveyor pump 3 through the main inlet pipe 30, the inlet branch pipe 28, and the inlet pipes in rows 11 of the filtering and adsorbing tank 4, the wastewater is filtered and adsorbed by the filtering and adsorbing material 34 in the filtering and adsorbing tank 4, and the filtered and adsorbed wastewater is discharged through the outlet pipes in rows 12 therein. The filtering and adsorbing treatment of the filtering and adsorbing tank 4 is to eliminate suspending solids and substances in gel-state, to adsorb organic compounds, and to perform the deodorizing and decolorizing functions. The main outlet pipe 31 of the filtering and adsorbing tank 4 is connected with the inlet port of the clean water reservoir 26. In addition, the outlet flow meter 10, the online water quality monitoring sensor 16, and the outlet water adjusting valve 9 are mounted on the main outlet pipe 31 of the filtering and adsorbing tank 4. The clean water reservoir outlet port 37 is connected with the primary sedimentation tanks of sewage treatment system of a paper mill by conduits, and the water discharged from the clean water reservoir 26 is transported into the sedimentation tanks of the sewage treatment system of an industrial enterprise for further treatment.

The online water quality monitoring system, which is mounted to the wastewater and sewage filtering and adsorbing unit, is used for checking the outlet water quality through the online water quality monitoring sensor 16 mounted on the main outlet pipe of the filtering and adsorbing tank 4, and for displaying that the active coke powder in the filtering and adsorbing tank 4 having reached a saturated state and becoming the saturated active coke sludge when the COD value of the outlet water of the filtering and adsorbing tank 4 is to reach the predetermined upper limit, which is 900, for example; then the control system shuts off the wastewater conveyor pump 3 automatically so as to stop supplying waste water to the filtering and adsorbing tank 4, and the control system starts the active coke sludge conveyor device 20, which is mounted under the active coke sludge discharge port at the bottom of the filtering and adsorbing tank 4, to transport the saturated active coke sludge into the saturated active coke sludge settling tank 5; and the active coke powder in the active coke powder storage 1 is supplied into the filtering and adsorbing tank 4 automatically when the saturated active coke sludge is discharged from the filtering and adsorbing tank 4 by means of the active coke sludge conveyor device 20. When the control system detects that the saturated active coke sludge has been completely discharged by means of the saturated active coke sludge metering device 24 mounted between the active coke sludge conveyor device 20 and the saturated active coke sludge settling tank 5, the control system stops the active coke sludge conveyor device 20 automatically and starts the wastewater conveyor pump 3 so as to restart the filtering and adsorbing treatment process.

When the filtering and adsorbing unit displays that the outlet flow is reduced, a backwashing pump 21 starts to clean the filter screen 13 of the outlet pipes in rows 12.

When the saturated active coke sludge is transported into the active coke sludge settling tank 5 and has undergone settling, the clear-water at the upper portion is discharged into the primary sedimentation tanks of the sewage treatment system of the industrial enterprise for further treatment, while the active coke sludge produced from the deposited saturated active coke sludge can be made into fuel for the solid and liquid propane dual-fuel circulating fluidized bed boiler (which is another invention by the same inventors of the present invention, and has been put into production).

The wastewater and sewage filtering and adsorbing unit can be used in series, so that the COD value of the wastewater, waste liquid, and sewage can be reduced to a lower value; the wastewater and sewage filtering and adsorbing unit can also be used in parallel, so that the treatment quantity of the wastewater, waste liquid, and sewage within a specified time can be increased.

After the wastewater, waste liquid, and sewage is treated by the filtering and adsorbing unit, the COD value of the treated wastewater can be reduced by 60~75%, its SS value (suspending substances) can be reduced by 90%, and its chroma can be reduced by 90%.

BRIEF DESCRIPTION OF THE DRAWINGS

The following will be detailed description of the embodiments of the present invention with reference to the attached drawings, in which.

DETAILED DESCRIPTION OF THE PREFERRED EMBODIMENT

Example 1

Figure 1:
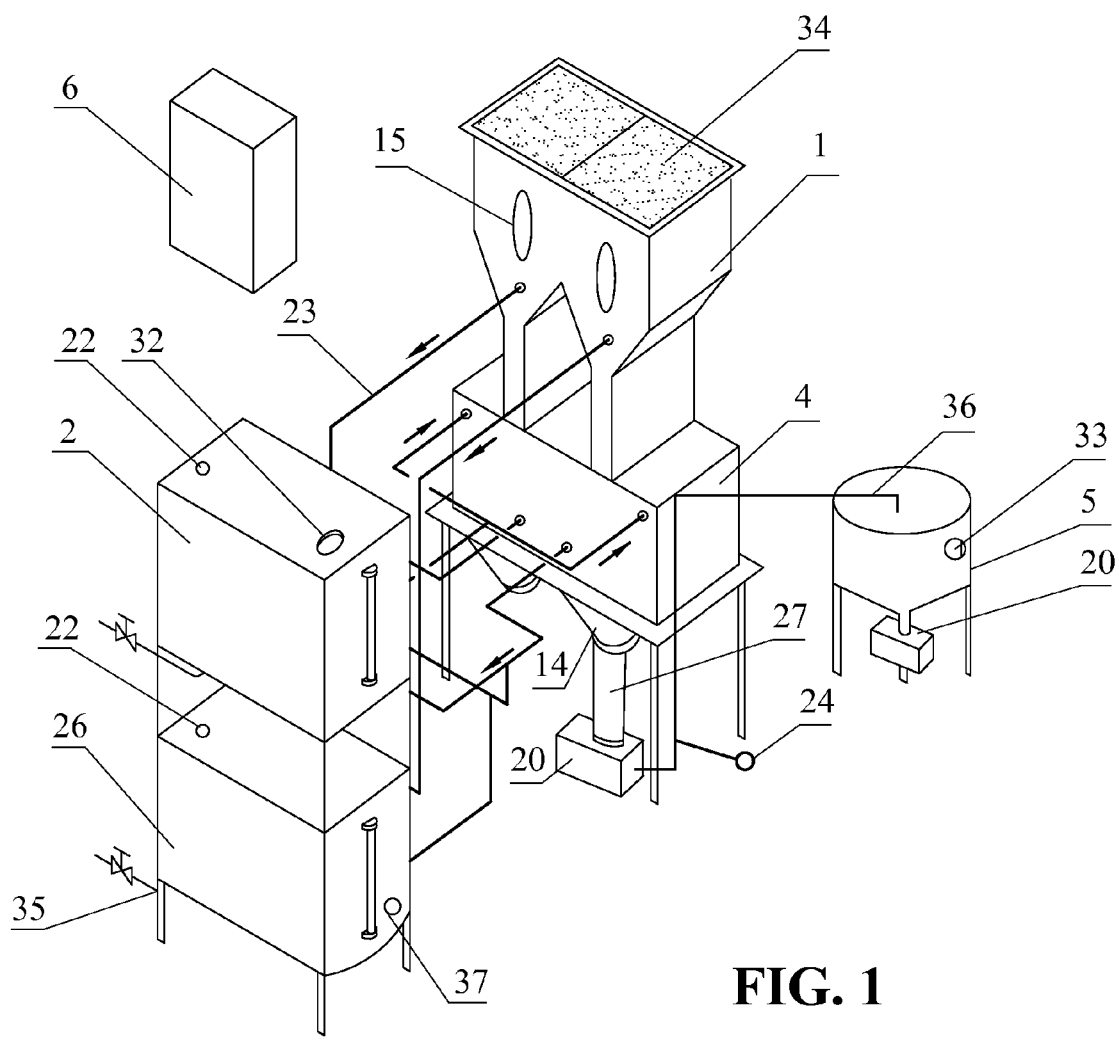
FIG. 1 is a schematic view of a filtering and adsorbing unit according to present invention, which shows the configuration and working principle of the filtering and adsorbing unit.
Figure 2:
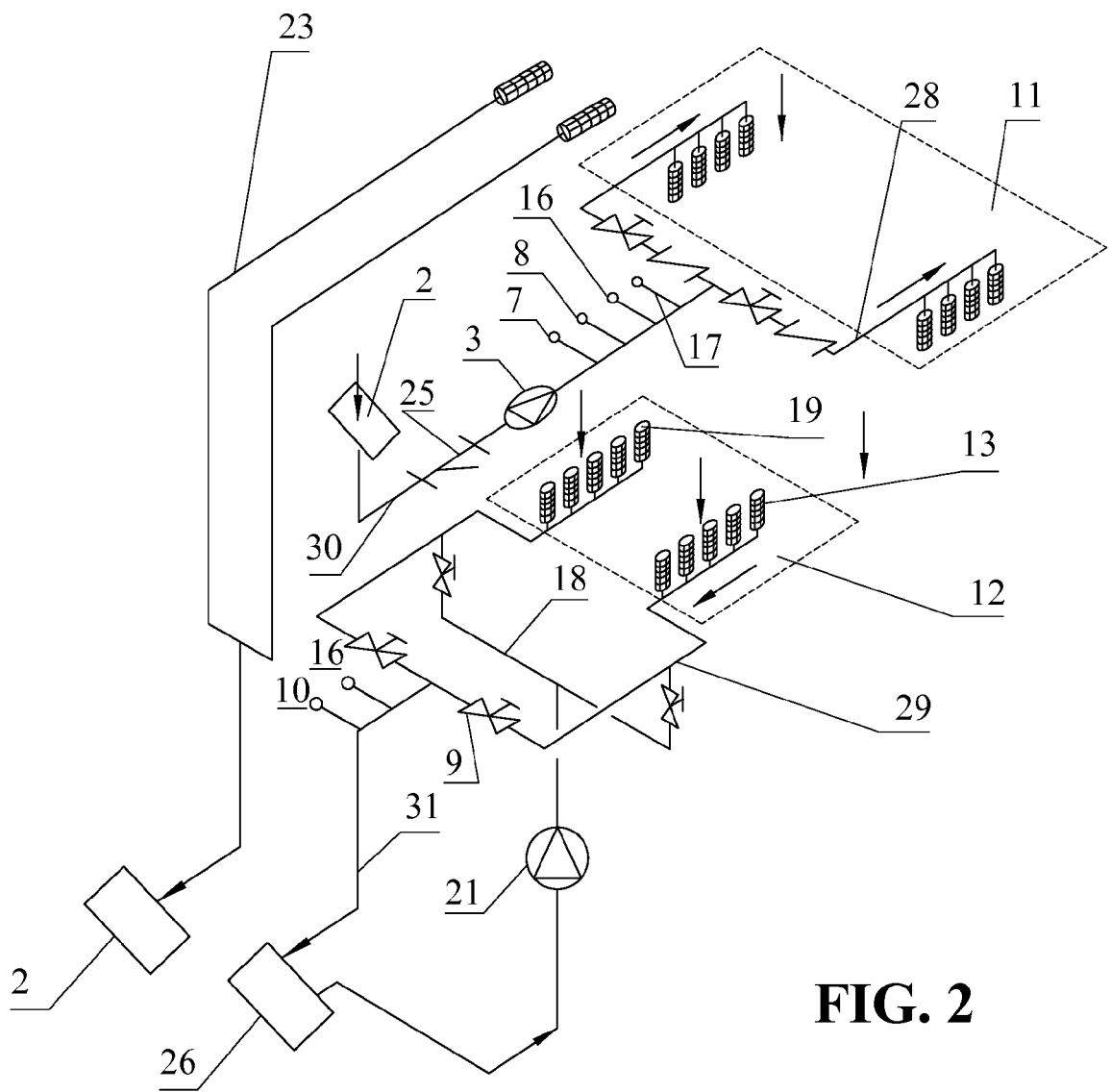
FIG. 2 is a schematic view of the piping layout of the filtering and adsorbing unit according to present invention.

Composition of the wastewater of a paper mill is as follows: the COD value is 3,000 mg/L, content of suspended solids is 800 mg/L, and the chroma is 430.

The active coke powder 34, whose granularity is 0.2~1 mm, and having granularity of ≧0.5 mm for no less than 40% of the total amount of the active coke powder 34, is stored into active coke powder storage 1 of the wastewater and sewage filtering and adsorbing unit, and is used as the filtering and adsorbing material. And the active coke powder is in the form of metallurgical active coke powder. When the wastewater and sewage filtering and adsorbing unit is operating, the active coke powder 34 is supplied into the filtering and adsorbing tank 4 through the supplying ports, the connecting conduits, and the feeding ports of the filtering and adsorbing tank 4 under the bottom of the active coke powder storage 1. And the wastewater delivered into the active coke powder storage 1, by means of siphonage, is discharged back into the sewage reservoir 2 through the overflow pipes 23, which are mounted on the upper side of the supplying port of the active coke powder storage 1 and are connected with the sewage reservoir 2. An observation window 15 is provided with the active coke powder storage 1 for observing the amount of the active coke powder 34 stored therein.

When wastewater is transported into a sewage treatment plant of a paper mill, it is firstly treated through bar screens and centrifuges, through the equalization basins after removal of larger suspended substances, and the processed wastewater is then transported into the sewage reservoir 2 of the filtering and adsorbing unit.

The conveyor pump 3, which is mounted on the main inlet pipe 30 between the sewage reservoir 2 and the filtering and adsorbing tank 4, is used for transporting the sewage from the sewage reservoir 2 to the filtering and adsorbing tank 4. Besides the installation of the conveyor pump 3, a filter 25, a pressure sensor 7, an inlet flow meter 8, and an online water quality monitoring sensor 16 are also mounted on the main inlet pipe 30 between the sewage reservoir 2 and the filtering and adsorbing tank 4 for measuring the pressure and quantity of the wastewater, waste liquid, and sewage flow into the filtering and adsorbing tank 4, monitoring the water quality of the wastewater, waste liquid, and sewage thereof, and transmitting the corresponding signals to the control cabinet 5, and adjusting and controlling the amount of the wastewater, waste liquid, and sewage flowing into the filtering and adsorbing tank 4.

The inlet pipes in rows 11 and the outlet pipes in rows 12 are mounted inside the filtering and adsorbing tank 4, in which the inlet pipes in rows 11 comprising a plurality of standpipes 19 of DN15, with each standpipe 19 full of pores of 2 mm thereon; and the exterior of each standpipe 19 is provided with a filter screen 13 of 30 mesh made of stainless steel; each row of the standpipes 19 are connected with an inlet branch pipe 28, and a water flow adjusting valve 9 is mounted at the connecting junction between the inlet branch pipe 28 and the main inlet pipe 30. The outlet pipes in rows 12 comprise of the standpipes 19 of DN15, with each standpipe 19 full of pores of 2 mm thereon; and the exterior of each standpipe 19 is provided with a filter screen 13 of 30 mesh and made of stainless steel; each row of standpipes 19 are connected with an outlet branch pipe 29; and a water flow adjusting valve 9 is mounted at the connecting junction between the outlet branch pipe 29 and the main outlet pipe 31. A plurality of parallel pipes 18 are mounted on the outlet branch pipe 29; the parallel pipe 18 is provided with valves, and the parallel pipe 18 is connected with a backwashing pump 21.

The distance between the inlet pipes in rows 11 and the outlet pipes in rows 12 in the filtering and adsorbing tank 4 is 0.9 m; the flow rate of the wastewater, waste liquid, and sewage to be treated in the filtering and adsorbing tank 4 is 0.16 m/min; and the contact time between the wastewater and the active coke powder inside the filtering and adsorbing tank 4 is 12 min. The contact time between the wastewater and the active coke powder can be controlled and adjusted by controlling the flow rate and flow amount of the wastewater into the filtering and adsorbing tank 4. When the wastewater in the sewage reservoir is transported into the filtering and adsorbing tank 4 by the conveyor pump 3 through the main inlet pipe 30, the outlet branch pipe 28, and the inlet pipes in rows 11 of the filtering and adsorbing tank 4, the wastewater is filtered and adsorbed by means of the filtering and adsorbing material 34 inside the filtering and adsorbing tank 4, and then the treated wastewater is discharged through the outlet pipes in rows 12 therein, the outlet branch pipe 29, and the main outlet pipe 31, respectively. The filtering and adsorbing treatment by means of the filtering and adsorbing tank 4 is to remove the suspended solids and gel-state substances, to adsorb organic compounds, and to perform the deodorizing and decolorizing functions. An outlet flow meter 10, an online water quality monitoring sensor 16, and an outlet water adjusting valve 9 are mounted on the main outlet pipe 31 of the filtering and adsorbing tank 4; the main outlet pipe 31 of the filtering and adsorbing tank 4 is connected with an inlet port of the clean water reservoir 26. A clean water reservoir outlet port 37 is connected with the primary sedimentation tanks of a sewage treatment system of a paper mill by conduits, and the water discharged from the clean water reservoir 26 is transported into the sedimentation tanks of the sewage treatment system of the industrial enterprise for further treatment.

An online water quality monitoring system, which is mounted to the wastewater and sewage filtering and adsorbing unit, is used for checking the outlet water quality of the filtering and adsorbing tank 4 through the online water quality monitoring sensor 16 mounted on the main outlet pipe of the filtering and adsorbing tank 4, and displaying of that the active coke powder in the filtering and adsorbing tank 4 having reached a saturated state and becoming the saturated active coke sludge when the COD value of the outlet water of the filtering and adsorbing tank 4 is to reach the predetermined upper limit, which is 900, for example. Then a control system shuts off the wastewater conveyor pump 3 automatically, so as to stop supplying wastewater to the filtering and adsorbing tank 4, and the control system starts an active coke sludge conveyor device 20, which is mounted under an active coke sludge discharge port at the bottom of the filtering and adsorbing tank 4, to transport the saturated active coke sludge into the saturated active coke sludge settling tank 5; and the active coke powder in the active coke powder storage 1 is supplied into the filtering and adsorbing tank 4 automatically when the saturated active coke sludge is discharged from the filtering and adsorbing tank 4 by means of the active coke sludge conveyor device 20. When the control system detects that the saturated active coke sludge has been completely discharged by means of the saturated active coke sludge metering device 24 mounted between the active coke sludge conveyor device 20 and the saturated active coke sludge settling tank 5, the control system stops the active coke sludge conveyor device 20 automatically and starts the wastewater conveyor pump 3 so as to restart the filtering and adsorbing treatment process. When the filtering and adsorbing unit displays that the outlet flow is reduced, a backwashing pump 21 starts to clean the filter screen 13 of the outlet pipes in rows.

When the saturated active coke sludge is transported into the active coke sludge settling tank 5, and has undergone settling, the clear-water at the upper portion is discharged into the primary sedimentation tanks of the sewage treatment system of the industrial enterprise for further treatment, while the active coke sludge produced from the deposited saturated active coke sludge can be made into fuel for the solid and liquid propane dual-fuel circulating fluidized bed boiler (which is another invention as the same inventor of the present invention, and has been put into production), that is the wastewater active coke slurry.

The filtering and adsorbing treatment of the filtering and adsorbing tank 4 removes suspended solids and substances in gel-states, to adsorb organic compounds, and to perform deodorizing and decolorizing functions. The COD value is reduced from the original value of 3000 to 900, the content of the suspended solids is reduced to 240 mg/L, and the chroma to 50.

Example 2

Composition of the digestion liquor of a paper mill is as follows: the COD value is 10,000 mg/L, the content of suspended solids is 2800 mg/L, and the chroma is at 1,030.

The active coke powder 34, whose granularity is between 0.2 mm~1 mm, and having granularity of $\geqq 0.5$ mm for no less than 40% of the total amount of the active coke powder 34, is stored into the active coke powder storage 1 of the wastewater and sewage filtering and adsorbing unit, and is used as the filtering and adsorbing material. And the active coke powder is metallurgical active coke powder. When the wastewater and sewage filtering and adsorbing unit is operating, the active coke powder 34 is supplied into the filtering and adsorbing tank 4 through the supplying ports, the connecting conduits, and the feeding ports of the filtering and adsorbing tank 4 under the bottom of the active coke powder storage 1. And the wastewater delivered into the active coke powder storage 1, by means of siphonage, is discharged back into the sewage reservoir 2 through the overflow pipes 23, which are mounted on the upper side of the supplying port of the active coke powder storage 1 and are connected with the sewage reservoir 2. An observation window 15 is provided on the active coke powder storage 1 for observing the amount of the active coke powder 34 stored therein.

When the digestion liquor is transported into a sewage treatment plant of a paper mill, it is firstly treated through bar screens and centrifuges, and through the equalization basins after removal of the larger suspended substances; and the processed digestion liquor is then transported into the sewage reservoir 2 of the filtering and adsorbing unit; the conveyor pump 3, which is mounted on the main inlet pipe 30 between the sewage reservoir 2 and the filtering and adsorbing tank 4, is used for transporting the sewage from the sewage reservoir 2 to the filtering and adsorbing tank 4. Besides the installation of the conveyor pump 3, a filter 25, a pressure sensor 7, an inlet flow meter 8, and an online water quality monitoring sensor 16 are also mounted on the main inlet pipe 30 between the sewage reservoir 2 and the filtering and adsorbing tank 4 for measuring the pressure and the quantity of wastewater, waste liquid, and sewage flow into the filtering and adsorbing tank 4, monitoring the water quality of the wastewater, waste liquid, and sewage thereof, and transmitting the corresponding signals to the control cabinet 5, and adjusting and controlling the amount of the wastewater, waste liquid, and sewage flow into the filtering and adsorbing tank 4.

The inlet pipes in rows 11 and the outlet pipes in rows 12 are mounted in the filtering and adsorbing tank 4, in which the inlet pipes in rows 11 include the standpipes 19 of DN15, with each standpipe 19 full of pores of 2 mm thereon; and the exterior of each standpipe 19 is provided with a filter screen 13 of 30 mesh and made of stainless steel; each row of the standpipes 19 is connected with an inlet branch pipe 28, and a water flow adjusting valve 9 is mounted at the connecting junction of the inlet branch pipe 28 and the main inlet pipe 30. The outlet pipes in rows 12 includes standpipes 19 of DN15, with each standpipe 19 full of pores of 2 mm thereon, and the exterior of each standpipe 19 provided with a filter screen 13 of 30 mesh and made of stainless steel; each row of the standpipes 19 are connected with an outlet branch pipe 29, and a water flow adjusting valve 9 is mounted at the connecting junction between the outlet branch pipe 29 and the main outlet pipe 31. The outlet branch pipe 29 is mounted with the parallel pipes 18; the parallel pipe 18 is provided with valves, and the parallel pipe is connected with a backwashing pump 21.

The distance between the inlet pipes in rows 11 and the outlet pipes in rows 12 in the filtering and adsorbing tank 4 is 0.9 m; the flow rate of the wastewater, waste liquid, and sewage to be treated in the filtering and adsorbing tank 4 is 0.16 m/min; and the contact time between the wastewater and the active coke powder in the filtering and adsorbing tank 4 is 12 min; the contact time of the wastewater and the active coke powder can be controlled and adjusted by controlling the flow rate and the flow amount of the wastewater into the filtering and adsorbing tank 4. When the wastewater in the sewage reservoir is transported into the filtering and adsorbing tank 4 by the conveyor pump 3 through the main inlet pipe 30, the outlet branch pipe 28, and the inlet pipes in rows 11 of the filtering and adsorbing tank 4, the wastewater is is filtered and adsorbed by the filtering and adsorbing material 34 in the filtering and adsorbing tank 4, and then the treated wastewater is discharged through the outlet pipes in rows 12 therein, the outlet branch pipe 29, and the main outlet pipe 31, respectively. The filtering and adsorbing treatment of the filtering and adsorbing tank 4 is to remove the suspended solids and gel-state substances, to adsorb organic compounds, and to perform the deodorizing and decolorizing functions. An outlet flow meter 10, an online water quality monitoring sensor 16, and an outlet water adjusting valve 9 are mounted on the main outlet pipe 31. The main outlet pipe 31 of the filtering and adsorbing tank 4 is connected with an inlet port of the clean water reservoir 26; a clean water reservoir outlet port 37 is connected with the primary sedimentation tanks of a sewage treatment system of a paper mill by conduits, and the water discharged from the clean water reservoir 26 is transported into the sedimentation tanks of the sewage treatment system of the industrial enterprise for further treatment.

An online water quality monitoring system, which is mounted to the wastewater and sewage filtering and adsorbing unit, is used for checking the outlet water quality of the filtering and adsorbing tank 4 through the online water quality monitoring sensor 16 mounted on the main outlet pipe 31 of the filtering and adsorbing tank 4, and displaying that the active coke powder in the filtering and adsorbing tank 4 to have reached a saturated state and becoming the saturated active coke sludge when the COD value of the outlet water of the filtering and adsorbing tank 4 is to reach the predetermined upper limit, which is 900; then a control system shuts off the wastewater conveyor pump 3 automatically so as to stop supplying wastewater to the filtering and adsorbing tank 4, and the control system starts an active coke sludge conveyor device 20, which is mounted under an active coke sludge discharge port at the bottom of the filtering and adsorbing tank 4, to transport the saturated active coke sludge into the saturated active coke sludge settling tank 5; and the active coke powder in the active coke powder storage 1 is supplied into the filtering and adsorbing tank 4 automatically when the saturated active coke sludge is discharged from the filtering and adsorbing tank 4 by means of the active coke sludge conveyor device 20. When the control system detects that the saturated active coke sludge has been completely discharged by means of the saturated active coke sludge metering device 24 mounted between the active coke sludge conveyor device 20 and the saturated active coke sludge settling tank 5, the control system stops the active coke sludge conveyor device 20 automatically and starts the wastewater conveyor pump 3 so as to restart the filtering and adsorbing treatment process. When the filtering and adsorbing unit displays that the outlet flow is reduced, a backwashing pump 21 starts to clean the filter screen 13 of the outlet pipes in rows 12.

Figure 3:
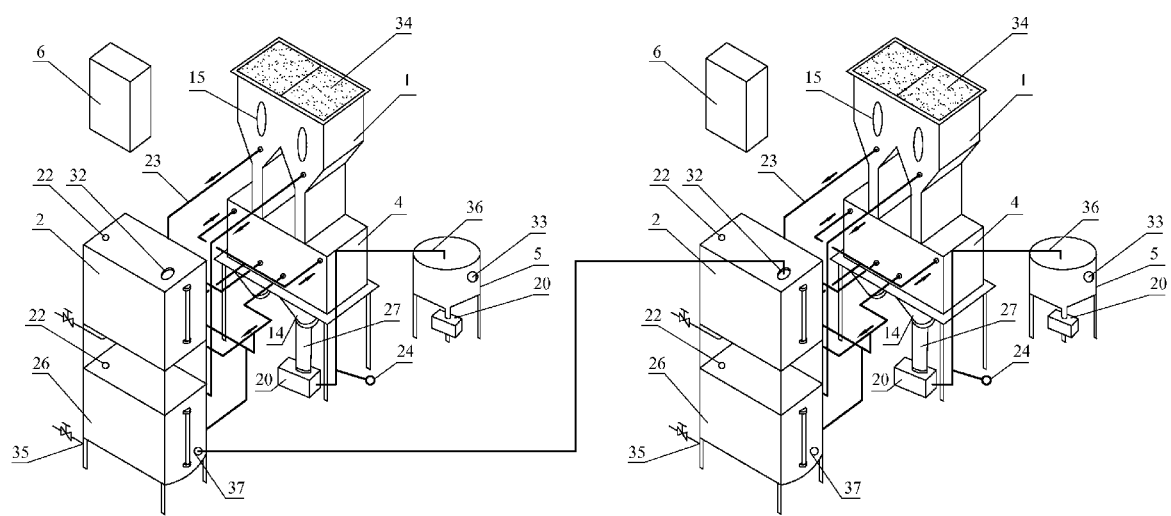
FIG. 3 is a schematic view of a plurality of filtering and adsorbing units used in series according to another embodiment of the present invention.
Figure 4:
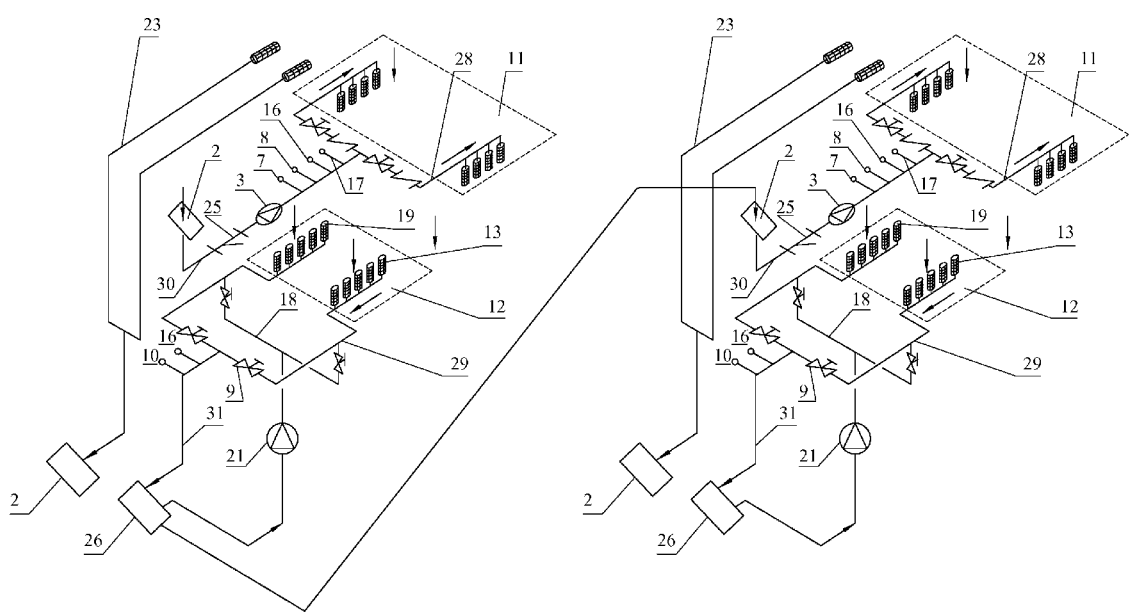
FIG. 4 is a schematic view of the piping layout of the filtering and adsorbing units used in series according to another embodiment of the present invention.

Since the COD value, SS value (suspended substances), and chroma of the digestion liquor of a paper mill are all very high, two sets of wastewater and sewage filtering and adsorbing units are used in series. After the digestion liquor has been treated by a first filtering and adsorbing unit, the COD value is reduced to 3,000, the SS value (suspended substances) is reduced to 840, and the chroma is at 200 times. A clean water reservoir outlet port 37 of the first filtering and adsorbing unit is connected to an inlet port of the sewage reservoir 2 of a second filtering and adsorbing unit via piping, on which a conveyor pump 3 is mounted for transporting the digestion liquor having been treated by the first filtering and adsorbing unit into the sewage reservoir 2 of the second filtering and adsorbing unit. After having been treated by the second filtering and adsorbing unit, the COD of the treated digestion liquor is reduced to 900, the content of suspended solids is reduced to 170, and the chroma is reduced to 50. A clean water reservoir outlet port 37 of the second filtering and adsorbing unit is connected with the primary sedimentation tanks of a sewage treatment system of the paper mill by conduits, and the water discharged from the clean water reservoir 26 is transported to the sedimentation tanks of the sewage treatment system of the industrial enterprise for further treatment. (see FIG. 3 and 4)

When the saturated active coke sludge is transported into the active coke sludge settling tank, and has undergone settling, the clear-water at the upper portion is discharged into the primary sedimentation tanks of the sewage treatment system of the industrial enterprise for further treatment, while the active coke sludge produced from the deposited saturated active coke sludge can be made into fuel for the solid and liquid propane dual-fuel circulating fluidized bed boiler.

What is claimed is:

1. A wastewater filtering and adsorbing unit, comprising:
a sewage reservoir;
a clean water reservoir;
an active coke powder storage;
a filtering and adsorbing tank;
a control cabinet;
a saturated active coke sludge settling tank; and
a filtering and adsorbing material, wherein the sewage reservoir and the clean water reservoir are positioned adjacent to each other on a first side of the unit, the filtering and adsorbing tank and the active coke powder storage are positioned adjacent to each other on a second side of the unit, with the active coke powder storage mounted above the filtering and adsorbing tank, and a bottom of the active coke powder storage is connected to a top of the filtering and adsorbing tank by means of a plurality of conduits therebetween for transporting the filtering and adsorbing material; a plurality of inlet pipes in rows connected by an inlet branch pipe and a plurality of outlet pipes in rows connected by an outlet branch pipe are disposed respectively inside an upper part and a lower part of the filtering and adsorbing tank; a main inlet pipe is connected between an outlet port of the sewage reservoir and the inlet branch pipe of the filtering and adsorbing tank, and a water flow adjusting valve, a filter, a conveyor pump, a pressure sensor, an inlet flow meter, a first online water quality monitoring sensor, and a pressure gauge are mounted on the main inlet pipe; a main outlet pipe is connected between the outlet branch pipe of the filtering and adsorbing tank and an inlet port of the clean water reservoir; an outlet flow meter and a second online water quality monitoring sensor are mounted on the main outlet pipe; the active coke powder storage is used for storage of the filtering and adsorbing material; and a plurality of overflow pipes are mounted in a center portion of the active coke powder storage, and the overflow pipes are connected with the sewage reservoir; a bottom of the filtering and adsorbing tank is provided with a saturated active coke sludge discharge port which is connected to an active coke sludge conveyor device through a transport conduit; and a transport pipeline connects the active coke sludge conveyor device to the saturated active coke sludge settling tank.

2. The wastewater filtering and adsorbing unit as claimed in claim 1, wherein the filtering and adsorbing material is an active coke powder and is in the form of bituminous active coke powder, lignite semi-active coke powder, silica active coke powder, gas-coal active coke powder, or metallurgical active coke powder.

3. The wastewater filtering and adsorbing unit as claimed in claim 1, wherein the inlet pipes in rows comprise a plurality of rows of standpipes each having a diameter between 15 to 40 mm, wherein each standpipe is formed with pores of between 1 mm to 2 mm, and an exterior of each standpipe is provided with a filter screen made of stainless steel; each row of the standpipes is connected with the inlet branch pipe; and the water flow adjusting valve is mounted between a connecting junction of the inlet branch pipe and the main inlet pipe.

4. The wastewater filtering and adsorbing unit as claimed in claim 1, wherein the outlet pipes in rows comprise a plurality of rows of standpipes each having a diameter between 15 to 40 mm, wherein each standpipe is formed with pores of diameters between 1 mm to 2 mm, and an exterior of each standpipe is provided with a filter screen made of stainless steel; each row of the standpipes is connected with the outlet branch pipe; and the water flow adjusting valve is mounted between a connecting junction of the outlet branch pipe and the main outlet pipe, and the outlet branch pipe is mounted with a valve connected to a parallel pipe and a backwashing pump.

5. The wastewater filtering and adsorbing unit as claimed in claim 1, wherein an observation window is provided on the active coke powder storage; a liquid level sensor is mounted on the sewage reservoir and the clean water reservoir, respectively, and transmits signals to the control cabinet.

6. The wastewater filtering and adsorbing unit as claimed in claim 1, wherein the control cabinet is provided with a control system and instruments for receiving a plurality of data and displaying working states of the wastewater filtering and adsorbing unit through using the pressure sensor, the pressure gauge, the outlet flow meter, and the first and second online water quality monitoring sensors mounted on the main inlet pipe and the main outlet pipe, and the liquid level sensors mounted on the sewage reservoir and the clean water reservoir, and the control system is to control starting and stopping of the conveyor pump and the active coke sludge conveyor device, wherein the control system shuts off the conveyor pump and simultaneously starts the active coke sludge conveyor device to discharge the saturated active coke sludge from the filtering and adsorbing tank, and transport the saturated active coke sludge to the saturated active coke sludge settling tank when a signal output by the second online water quality monitoring sensor displays that the water quality has reached a predetermined upper limit; and the control system shuts off the active coke sludge conveyor device and simultaneously staffs the conveyor pump to transport the wastewater from the sewage reservoir to the filtering and adsorbing tank for treatment after the saturated active coke sludge in the filtering and adsorbing tank is completely discharged and the filtering and adsorbing material in the active coke powder storage is supplied into the filtering and adsorbing tank, and a signal of complete discharge of the saturated active coke sludge is sent to the control cabinet by a saturated active coke sludge metering device, which is used for measuring the amount of the saturated active coke sludge discharged from the filtering and adsorbing tank, mounted on the transport pipeline connected between the active coke sludge conveyor device and the saturated active coke sludge settling tank.

7. The wastewater filtering and adsorbing unit as claimed in claim 1, wherein the distance between the inlet pipes in rows and the outlet pipes in rows inside the filtering and adsorbing tank is controlled by positioning the inlet branch pipe and the outlet branch pipe depending on chemical oxygen demand and suspended solids values of the wastewater.

8. The wastewater filtering and adsorbing unit as claimed in claim 1, wherein an outlet port of the clean water reservoir is connected to an inlet port of the sewage reservoir of another wastewater filtering and adsorbing unit.

\* \* \* \* \*